United States Patent
Reimer et al.

(10) Patent No.: US 6,713,894 B1
(45) Date of Patent: Mar. 30, 2004

(54) DEVICE FOR SUPPLYING ELECTRICITY TO A MOTOR VEHICLE

(75) Inventors: Stefan Reimer, Puttenhausen (DE); Falk Gerbig, Allershausen (DE); Peter Bachmann, Ottobrunn (DE); Matthias Weisser, Taufkirchen (DE); Juergen Werner, Garching (DE); Stefan Zeit, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/581,287

(22) PCT Filed: Nov. 27, 1998

(86) PCT No.: PCT/EP98/07687

§ 371 (c)(1),
(2), (4) Date: Sep. 7, 2000

(87) PCT Pub. No.: WO99/30403

PCT Pub. Date: Jun. 17, 1999

(30) Foreign Application Priority Data

Dec. 11, 1997 (DE) .......................... 197 54 964

(51) Int. Cl.[7] ................................................ B60L 22/00
(52) U.S. Cl. ........................ 307/10.1; 320/104; 320/166
(58) Field of Search .......................... 307/10.1; 320/104, 320/166, 167

(56) References Cited

U.S. PATENT DOCUMENTS

| | | | | |
|---|---|---|---|---|
| 3,594,627 A | * | 7/1971 | Lesher | 320/103 |
| 3,778,814 A | * | 12/1973 | Dildy, Jr. | 327/107 |
| 3,787,704 A | * | 1/1974 | Dennewitz et al. | 315/159 |
| 4,054,826 A | * | 10/1977 | Wahlstrom | 310/308 |
| 4,126,822 A | * | 11/1978 | Wahlstrom | 310/309 |
| 4,220,907 A | * | 9/1980 | Pappas et al. | 310/15 |
| 4,408,607 A | * | 10/1983 | Maurer | 607/61 |
| 4,510,431 A | * | 4/1985 | Winkler | 320/103 |
| 4,996,637 A | * | 2/1991 | Piechnick | 307/43 |
| 5,105,776 A | * | 4/1992 | Tsuchiya et al. | 123/192.1 |
| H1113 H | * | 12/1992 | Yoshizaki | 123/179.21 |
| 5,196,780 A | * | 3/1993 | Pacholok | 320/148 |
| 5,250,775 A | * | 10/1993 | Maehara et al. | 307/43 |
| 5,285,862 A | * | 2/1994 | Furutani et al. | 180/65.4 |
| 5,300,125 A | * | 4/1994 | Desai et al. | 29/623.4 |
| 5,302,110 A | * | 4/1994 | Desai et al. | 429/159 |
| 5,303,118 A | * | 4/1994 | Saito et al. | 29/25.03 |
| 5,334,926 A | * | 8/1994 | Imaizumi | 307/10.1 |
| 5,440,179 A | * | 8/1995 | Severinsky | 307/64 |
| 5,446,365 A | * | 8/1995 | Nomura et al. | 320/128 |
| 5,465,094 A | * | 11/1995 | McEwan | 342/21 |
| 5,513,718 A | * | 5/1996 | Suzuki et al. | 320/166 |
| 5,783,872 A | * | 7/1998 | Blair | 307/10.1 |
| 5,793,189 A | * | 8/1998 | Kawaguchi et al. | 322/28 |
| 5,859,524 A | * | 1/1999 | Ettes | 320/114 |
| 5,877,609 A | * | 3/1999 | Carter | 320/103 |

(List continued on next page.)

FOREIGN PATENT DOCUMENTS

| | | |
|---|---|---|
| DE | 3104965 A1 | 8/1982 |
| DE | 0376667 A2 | 7/1990 |
| DE | 4421066 A1 | 1/1995 |

(List continued on next page.)

OTHER PUBLICATIONS

Kim et al, "Interface Circuits for Regenerative Operation of an Electric Vehicle", Jun. 1996, IEEE, 0–7803–2775–6/96.*

*Primary Examiner*—Gregory J. Toatley, Jr.
*Assistant Examiner*—Roberto J. Rios
(74) *Attorney, Agent, or Firm*—Crowell & Moring LLP

(57) ABSTRACT

A system for supplying electricity to a motor vehicle using a capacitor having a maximum value greater than the maximum value of a rechargeable battery. A transformer provides discharging of the capacitor from its maximum voltage down to the maximum voltage of the battery in order to provide excess energy in a short period of time to effectively charge the battery and simultaneously increase the service life of the chargeable battery.

3 Claims, 1 Drawing Sheet

U.S. PATENT DOCUMENTS

| | | | |
|---|---|---|---|
| 5,907,194 A | * 5/1999 | Schenk et al. | 320/104 |
| 5,986,436 A | * 11/1999 | Liu | 320/135 |
| 5,994,789 A | * 11/1999 | Ochiai | 307/10.1 |
| 6,009,864 A | * 1/2000 | Basso et al. | 123/599 |
| 6,064,178 A | * 5/2000 | Miller | 320/117 |
| 6,066,928 A | * 5/2000 | Kinoshita et al. | 180/65.8 |
| 6,069,804 A | * 5/2000 | Ingman et al. | 363/21.14 |
| 6,184,790 B1 | * 2/2001 | Gerig | 119/721 |
| 6,204,769 B1 | * 3/2001 | Arai et al. | 320/104 |
| 6,216,480 B1 | * 4/2001 | Camus et al. | 136/203 |
| 6,222,341 B1 | * 4/2001 | Dougherty et al. | 307/10.1 |
| 6,223,106 B1 | * 4/2001 | Yano et al. | 320/166 |
| 6,242,887 B1 | * 6/2001 | Burke | 320/104 |
| 6,304,056 B1 | * 10/2001 | Gale et al. | 320/104 |
| 6,314,346 B1 | * 11/2001 | Kitajima et al. | 320/104 |
| 6,373,152 B1 | * 4/2002 | Wang et al. | 320/167 |
| 6,437,538 B1 | * 8/2002 | Tsurumi et al. | 320/116 |

FOREIGN PATENT DOCUMENTS

| | | | | |
|---|---|---|---|---|
| DE | 4340350 A1 | | 6/1995 | |
| DE | 19542085 A1 | | 7/1996 | |
| DE | 195225563 A1 | | 1/1997 | |
| DE | 19540265 A1 | | 4/1997 | |
| DE | 10007546 | * | 8/2000 | H02M/3/10 |
| GB | 1438377 | | 8/1973 | |
| JP | 06-253409 | * | 9/1994 | H02J/7/00 |
| JP | 09-322314 | * | 12/1997 | B60L/11/18 |
| JP | 2001-145201 | * | 5/2001 | B60L/1/00 |
| JP | 2001-177914 | * | 6/2001 | B60L/11/18 |
| JP | 2001-292536 | * | 10/2001 | H02J/7/00 |
| JP | 2002-320302 | * | 10/2002 | B60L/7/22 |

* cited by examiner

DEVICE FOR SUPPLYING ELECTRICITY TO A MOTOR VEHICLE

BACKGROUND AND SUMMARY OF THE INVENTION

This application claims the priority of German Application 19754964.0, filed Dec. 11, 1997, the disclosures of which is expressly incorporated by reference herein.

The invention relates to a device for supplying electricity to a motor vehicle according to the preamble of claim 1.

A device of this type is known, for example, from German Patent Document DE 43 40 350 C2. This known device has a rechargeable battery, a capacitor which can be switched in parallel to the battery, and a circuit arrangement in the form of a logic circuit arranged between the battery and the capacitor. When the starter in the vehicle is actuated, the logic circuit defines a time window and carries out at least one voltage query. As a function of the result of this voltage query, the logic circuit switches the capacitor in parallel to the battery. The capacitor is preferably switched in parallel only when the voltage of the battery within the time window falls below a predetermined value. By means of this known circuit arrangement, with the capacitor switched in parallel to the battery, the starting of the vehicle is still ensured when the battery is almost discharged. However, with the parallel connection of the capacitor with the battery, the maximum capacitor voltage cannot exceed the value of the battery voltage. This known circuit arrangement is therefore not suitable for storing in the capacitor a high excess of energy for a short time and thus for effectively recharging a discharged battery.

In addition, a circuit arrangement for supplying electricity to a motor vehicle is known from German Patent Document DE 195 22 563 A1, in the case of which the energy stored in a capacitor, particularly the electric energy generated during a recuperative braking, is fed to a rechargeable battery in a controlled manner. However, this known circuit arrangement discloses no details concerning the type of the control or the ratio of the maximally possible capacitor voltage to the battery voltage.

Furthermore, with respect to the technical environment, reference is made to European Patent Document EP 0 568 655 B1, from which a device is known for supplying electricity to a motor vehicle which has two chargeable batteries of different nominal voltages and a circuit arrangement in the form of a voltage transformer arranged between the batteries.

It is an object of the invention to provide an improved device of type for supplying of electricity to a motor vehicle such that, on the one hand, an energy excess which is available for a short time is effectively utilized for charging a vehicle battery and simultaneously the service life of the rechargeable vehicle battery is increased.

The use of a capacitor (such as a Power Cap or Super Cap) whose nominal voltage and thus its maximally possible voltage is preferably several times higher than the nominal voltage of the battery is essential to the invention. By using such a buffer capacitor with a large voltage variation range as the energy accumulator, the voltage at the capacitor can be significantly increased beyond the battery voltage in order to be able to store in the best possible manner, a short-term energy excess, as, for example, resulting from recuperative braking. The battery is charged in a controlled manner by means of this capacitor by using a voltage transformer, preferably a DC/DC converter.

In a particularly advantageous further development of the invention, the charging of the battery is controlled by means of the capacitor by way of the voltage converter such that the charged capacitor is maximally discharged until a capacitor voltage is reached which is approximately equal to the momentary actual voltage of the battery. By means of this advantageous further development, a circuit arrangement can be used as a voltage transformer which only has to carry out a "downward" transformation in the sense of a voltage reduction starting from the capacitor voltage. As the result, the voltage transformer can be built, in a particularly simple manner, at reasonable cost, between the battery and the capacitor.

The invention also includes an expanded voltage transformer in such a manner that, in the reverse direction, the capacitor can be charged by way of the battery to a voltage whose value is larger than the value of the battery voltage.

The circuit arrangement according to the invention is used in the case of motor vehicles with a chargeable battery which has a higher than conventional nominal voltage (for example, 36 V instead of 12 V) in order to ensure the supply of high-power consuming devices whose number is constantly increasing in motor vehicles.

With a device for supplying electricity according to the invention, on the one hand, an energy excess which is available for a short time is effectively utilized and, on the other hand, a variable multivoltage electrical wiring is permitted.

Other objects, advantages and novel features of the present invention will become apparent from the following detailed description of the invention when considered in conjunction with the accompanying drawings.

BRIEF DESCRIPTION OF THE DRAWINGS

The drawing illustrates an embodiment of the invention.

DETAILED DESCRIPTION OF THE PREFERRED EMBODIMENT

Figure 1:
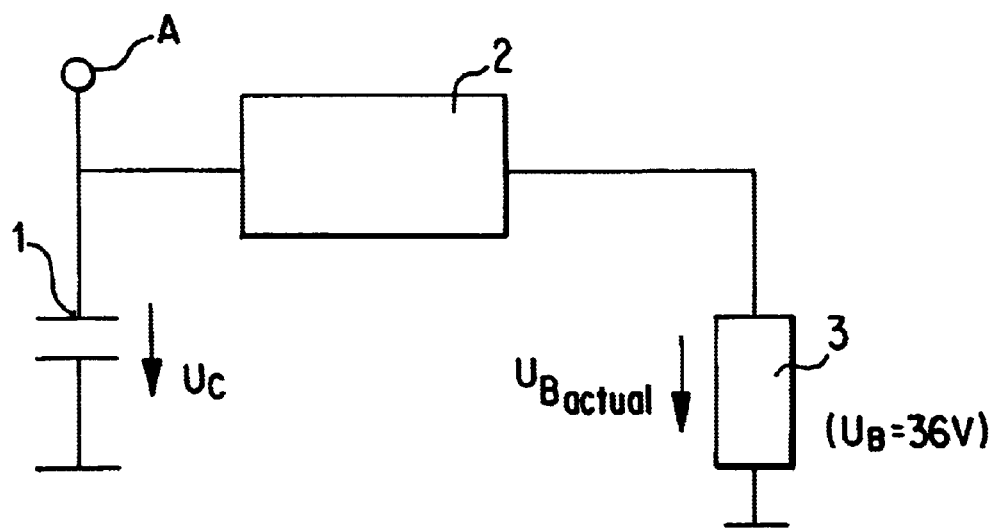
FIG. 1 is a view of a circuit arrangement according to the invention.

In FIG. 1, a capacitor 1 is connected by way of a voltage transformer 2, which preferably is a DC/DC converter, with a vehicle battery 3. As the capacitor 1, a buffer capacitor (power Cap), is preferably used which has a nominal voltage or maximally possible voltage $U_{C\ max}$ of, for example, 80 V. The battery 3 is, for example, a conventional battery with a nominal voltage $U_B$ of, for example, 36 V. Thus, the nominal voltage of the capacitor 1 is larger than the nominal voltage of the battery approximately by a factor 2.

The capacitor 1 can be charged by way of an electric connection A which is connected, for example, with a generator for the braking energy recirculation. The capacitor voltage $U_C$ is directly proportional to the charging condition of the capacitor 1. The ratio of the charging condition or of the charged amount of energy E to the capacitor voltage $U_C$ is obtained by the following formula: $E=½·C·U_C^2$. In the case of the double voltage $U_C$, four times the amount of Energy E can therefore be accumulated.

Additionally, as a result of its cycle stability and full-load stability, the service life of such a capacitor is significantly longer than that of a conventional motor vehicle battery.

If the capacitor 1 is charged at least in such a manner that the capacitor voltage $U_C$ is higher than the actual voltage $U_B$ $_{actual}$ of the battery 3, the voltage transformer 2 controls the charging of the battery 3 by the capacitor 1 corresponding to the requirement of the battery 3 and/or an electrical wiring (not shown here) optionally connected with the battery 3.

Figure 2:
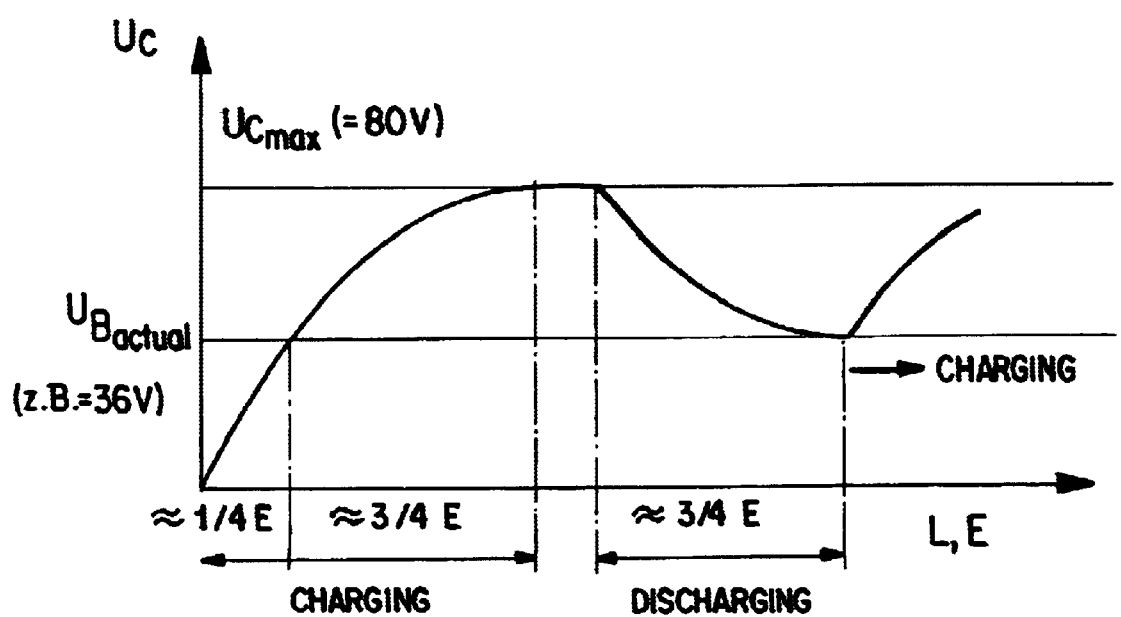
FIG. 2 is a view of a possible course of the capacitor voltage according to the control of the invention for charging the battery.

FIG. 2 illustrates in detail the manner and mode of the control of the voltage transformer 2. On the X-axis, FIG. 2 shows the load condition L or the accumulated amount of energy E and, on the Y-axis, FIG. 2 shows the pertaining capacitor voltage $U_C$. According to the invention, for example, based on a completely charged capacitor 1 ($U_C = U_{C\ max}$), the charging of the battery 3 by the discharging of the capacitor 1 is maximally carried out until the capacitor voltage $U_C$ has approximately reached the value of the actual voltage $U_{B\ actual}$ of the battery voltage 3. As a result, the voltage transformer 2 must carry out only a voltage downward transformation. If the capacitor 1 were to be discharged further, starting from the falling below the capacitor voltage $U_C = U_{B\ actual}$, the voltage transformer 2 would have to carry out a voltage upward transformation in the sense of a voltage increase. Although this can be technically implemented, it is inefficient in view of the requirement to have an efficiency which is as high as possible.

If, as in the illustrated embodiment according to FIG. 2, a discharge of the capacitor 1 has taken place starting from a voltage $U_C = 80V$ in such manner that the capacitor voltage $U_C$ has reached the value of the actual voltage $U_{B\ actual} = 36$ V (equal to the nominal voltage $U_B = 36$ V) of the battery 3, because of the above-mentioned relationships between the load condition L or the amount of energy E and the capacitor voltage $U_C$, in the event of a decrease of the capacitor voltage $U_C$ by approximately half, ¾ of the amount of energy E accumulated in the capacitor was already delivered to the battery 3.

By means of this control of the charging of the battery according to the invention, an optimal compromise is achieved between the circuit-related expenditures of the voltage transformer 2 and a utilization of the energy excess charged in the capacitor 1 for a short time, which is as efficient as possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for supplying electricity to a motor vehicle, comprising:

a chargeable battery;

a voltage transformer control device having a first end connected to said chargeable battery;

a capacitor for charging said chargeable battery connected to a second end of said voltage transformer control device wherein the maximum voltage of said capacitor is greater than a maximum voltage of said battery and wherein said transformer control device discharges said capacitor from a time that a voltage of said capacitor reaches said maximum voltage of said capacitor until said voltage of said capacitor is substantially equal to said maximum voltage of said battery.

2. A device according to claim 1, wherein said capacitor is discharged until the voltage of said capacitor is equal to the value of the actual voltage of the battery.

3. A method for supplying electricity to a motor vehicle, comprised the steps of:

providing a rechargeable battery having a nominal voltage;

providing an energy accumulator having a maximum voltage which is substantially greater than said nominal voltage;

discharging said energy accumulator from a time that a voltage on said accumulator reaches said maximum voltage of said accumulator until the voltage of said accumulator is substantially equal to said nominal voltage of said rechargeable battery.

\* \* \* \* \*